US012433186B2

(12) United States Patent
 Conboy et al.

(10) Patent No.: US 12,433,186 B2
(45) Date of Patent: Oct. 7, 2025

(54) SYSTEMS AND METHODS FOR MONITORING SEED PLACEMENT WITHIN THE GROUND USING ARTIFICIAL SEEDS

(71) Applicant: CNH Industrial America LLC, New Holland, PA (US)

(72) Inventors: Michael Christopher Conboy, Chicago, IL (US); Trevor Stanhope, Oak Lawn, IL (US)

(73) Assignee: CNH Industrial America LLC, New Holland, PA (US)

( * ) Notice: Subject to any disclaimer, the term of this patent is extended or adjusted under 35 U.S.C. 154(b) by 841 days.

(21) Appl. No.: 17/697,413

(22) Filed: Mar. 17, 2022

(65) Prior Publication Data

US 2023/0292649 A1    Sep. 21, 2023

(51) Int. Cl.
*A01C 7/10*    (2006.01)
*A01C 5/06*    (2006.01)

(52) U.S. Cl.
CPC .............. *A01C 7/105* (2013.01); *A01C 5/062* (2013.01); *A01C 5/066* (2013.01)

(58) Field of Classification Search
CPC ........... A01C 7/105; A01C 7/102; A01C 7/10; A01C 7/08; A01C 7/00; A01C 5/062; A01C 5/06; A01C 5/00; A01C 5/066
See application file for complete search history.

(56) References Cited

U.S. PATENT DOCUMENTS 6,082,466 A    7/2000 Gudat
7,511,618 B2   3/2009 Hornbaker et al.
8,730,084 B2   5/2014 Al-Khalefah et al.
(Continued)

FOREIGN PATENT DOCUMENTS

WO    WO 2019/085412    5/2019

OTHER PUBLICATIONS

Mapoka et al., "Modeling Ground Penetrating Radar (GPR) Technology for Seed Planting Depth Detection using Numerical Scheme based on Finite Difference Time Domain (FDTD) Method", American Society of Agricultural and Biological Engineers, St. Joseph, Michigan, 2016 ASABE Annual International Meeting 162460299. (doi:10.13031/aim.20162460299), (4 pages) https://www.semanticscholar.org/paper/Modeling-Ground-Penetrating-Radar-(GPR)-Technology-Mapoka-Birrell/79d77663f59bb4c1390d6a3333e928ac37963321.
(Continued)

*Primary Examiner* — Christopher J. Novosad
(74) *Attorney, Agent, or Firm* — Dority & Manning, P.A.

(57) ABSTRACT

A system for monitoring seed placement within the ground during the performance of a planting operation includes a row unit configured to create a furrow in the soil for depositing seeds and to close the furrow after the seeds have been deposited therein, where the seeds deposited within the soil include both real seeds and artificial seeds. The system may further include a seed sensor supported relative to the row unit and configured to generate data indicative of the artificial seeds as planted underneath a surface of the soil according to a dielectric property of the artificial seeds. Additionally, the system may include a computing system configured to receive the data generated by the seed sensor, and to determine a seed-related parameter associated with the artificial seeds as planted underneath the surface of the soil based at least in part on the data generated by the seed sensor.

20 Claims, 5 Drawing Sheets

(56) References Cited

U.S. PATENT DOCUMENTS

| | | |
|---|---|---|
| 8,810,406 B2 | 8/2014 | Sell |
| 9,756,774 B1 | 9/2017 | Wilson |
| 9,924,629 B2 | 3/2018 | Batcheller et al. |
| 10,371,814 B2 | 8/2019 | Chan et al. |
| 10,736,258 B2 | 8/2020 | Baurer et al. |
| 2016/0379024 A1* | 12/2016 | Tippery ........... G06K 19/07749 340/10.1 |
| 2021/0169023 A1 | 6/2021 | Haran et al. |

OTHER PUBLICATIONS

Mapoka et al., "Using gprMax to Model Ground-Penetrating Radar (GPR) to Locate Corn Seed as an Attempt to Measure Planting Depth", Transactions of the ASABE/American Society of Agricultural and Biological Engineers 62(3):673-686 DOI:10.13031/trans. 12809, Jan. 2019, (4 pages) https://reseachgate.net/publication/333990307_Using_gptMax_to_Model_Ground-Penetrating_Radar_GPR_to_Locate_Corn_seed_as_an_Attempt_to_Measure_Planting_Depth.

* cited by examiner

SYSTEMS AND METHODS FOR MONITORING SEED PLACEMENT WITHIN THE GROUND USING ARTIFICIAL SEEDS

FIELD OF THE INVENTION

The present disclosure relates generally to planting operations performed using a planting implement, such as a planter or a seeder, and, more particularly, to systems and methods for monitoring seed placement within the ground during the performance of a planting operation using artificial seeds.

BACKGROUND OF THE INVENTION

Planting implements, such as planters, are generally known for performing planting operations within a field. A typical planter includes a plurality of row units, with each row unit including various ground engaging tools for creating a furrow within the soil, placing a seed within the furrow, and closing the soil around the seed. Typically, to monitor the operation of a given row unit, a sensor will often be provided for detecting seeds as they pass through a seed tube of the row unit before being deposited within the furrow. Such sensor data is then used to estimate certain seed-related parameters, such as the seeding rate or population density. However, since the seed tube sensor is detecting the seeds prior to their deposition within the soil, the associated sensor data cannot be used to accurately estimate parameters related to the placement of seeds within the soil, such as the seed depth or spacing between seeds, particularly since the seeds may bounce, roll, or otherwise land off-target as they are dropped from the seed tube into the furrow. Seeds may also be displaced during the furrow closing process, which cannot be detected using the seed tube sensor.

Accordingly, an improved system and method for monitoring seed placement within the ground during the performance of a planting operation would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for monitoring seed placement within the ground during the performance of a planting operation. The system may include a row unit configured to deposit seeds within soil, the row unit including a furrow opening assembly configured to create a furrow in the soil for depositing seeds and a furrow closing assembly configured to close the furrow after the seeds have been deposited therein, where the seeds deposited within the soil include both real seeds and artificial seeds. The system may further include a seed sensor supported relative to the row unit and configured to generate data indicative of the artificial seeds as planted underneath a surface of the soil according to a dielectric property of the artificial seeds. Additionally, the system may include a computing system communicatively coupled to the seed sensor. The computing system may be configured to receive the data generated by the seed sensor, and to determine a seed-related parameter associated with the artificial seeds as planted underneath the surface of the soil based at least in part on the data generated by the seed sensor.

In another aspect, the present subject matter is directed to a method for monitoring seed placement within the ground during the performance of a planting operation by a row unit configured to deposit seeds within soil, where the row unit includes a furrow opening assembly configured to create a furrow in the soil for depositing seeds and a furrow closing assembly configured to close the furrow after the seeds have been deposited therein. The method may include depositing real seeds into the furrow during the performance of the planting operation and selectively depositing artificial seeds into the furrow during the performance of the planting operation. The method may further include receiving, with a computing device, data generated by a seed sensor supported relative to the row unit, the data being indicative of the artificial seeds as planted underneath a surface of the soil by the row unit during the planting operation. Additionally, the method may include determining, with the computing device, a seed-related parameter associated with the artificial seeds as planted underneath the surface of the soil based at least in part on the data generated by the seed sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
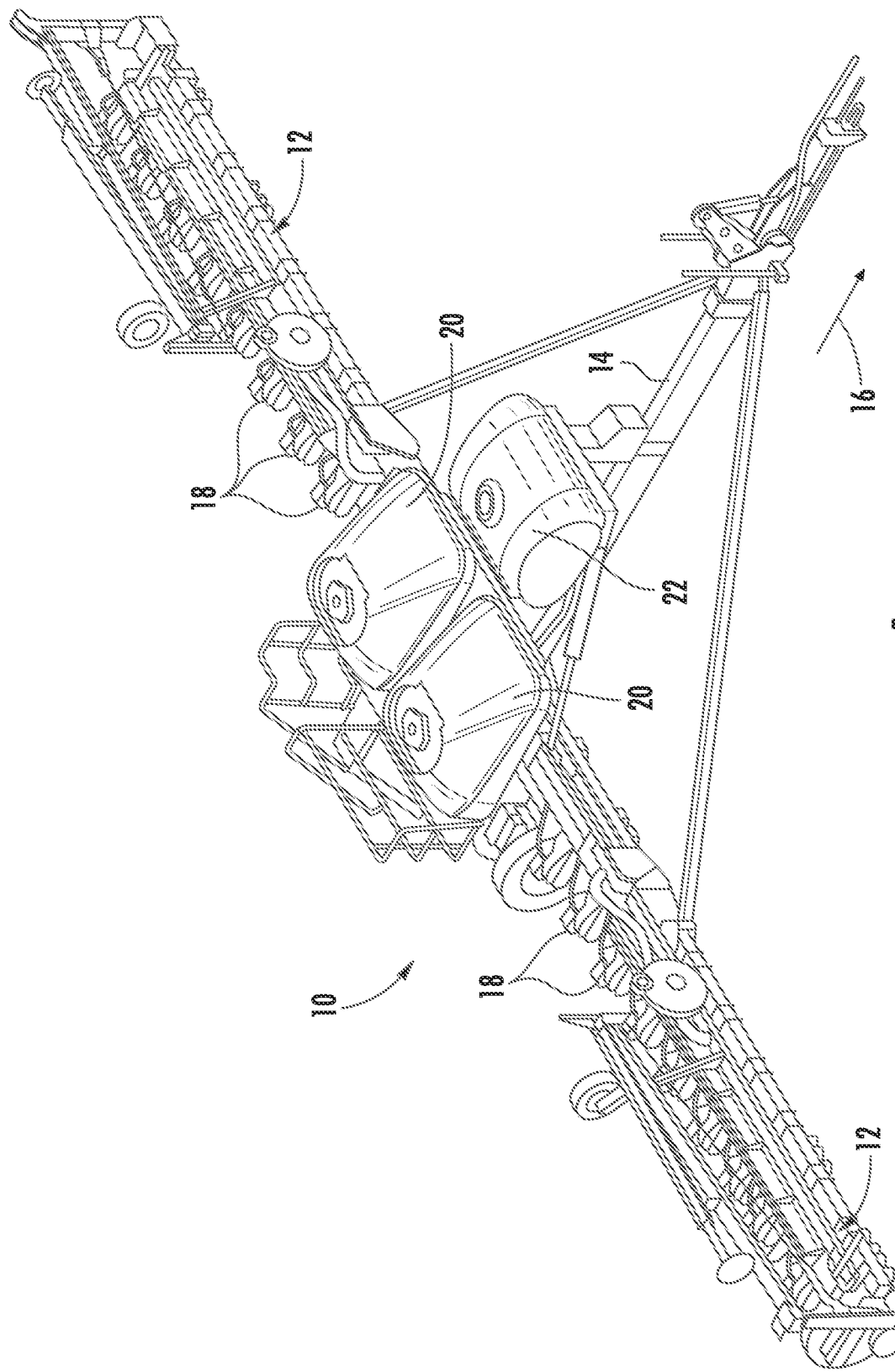
FIG. 1 illustrates a perspective view of one embodiment of a planting implement in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring seed placement within the ground during the performance of a planting operation. Specifically, in several embodiments, a planting implement may include a plurality of row units, with each row unit including various ground engaging tools for creating a furrow within the soil, placing a seed within the furrow, and closing the furrow around the seed. Additionally, one or more of the row units may also include or be associated with a seed sensor configured to detect seeds within the ground. For instance, in some embodiments, the seed sensor may correspond to a non-contact sensor, such as a ground-penetrating radar (GPR) or an electromagnetic induction (EMI) sensor, configured to detect seeds located underneath the soil (e.g., post-closing of the furrow) based on electromagnetic responses (e.g., radio waves reflected or an electromagnetic field generated) received in accordance with a dielectric property (e.g., electrical conductivity and/or permittivity) of the seeds. However, such non-contact sensors can have certain limitations in terms of detecting seeds underneath the soil. For instance, when ground has a higher moisture and/or clay contents, the ground causes higher attenuation of waves generated by a GPR, which means that GPR waves cannot penetrate the ground as deeply. Similarly, seeds typically have low to no conductivity, which makes them difficult to detect with an EMI sensor as a secondary EMI field generated in response to the seed will be very weak.

Thus, in accordance with aspects of the present subject matter, the row units associated with the seed sensors may be configured to selectively supply an artificial seed to be planted with, or instead of, a real seed, for instance at potential overlap areas (e.g., at headland turns), at certain prescribed intervals along straight-aways, or on-demand. The artificial seeds are configured to be more detectable to the seed sensors than real seeds. For instance, the artificial seeds may have a dielectric property (i.e., a permittivity and/or conductivity) that is different from the dielectric property of the real seeds. As such, the seed sensors are easily able to detect the artificial seeds, even when the ground has a higher moisture and/or clay content. The data generated by the seed sensor(s) indicative of at least the artificial seeds may then be communicated to a computing system configured to determine and/or monitor one or more seed-related parameters of the artificial seeds based on the sensor data, such as the seed depth, seed position within a trench, and/or the like, as well as one or more other seed-related parameters, such as relative seed spacing, seed population, row overlap, and/or the like. The seed-related parameters of the artificial seeds may also be used to determine the seed-related parameters of the real seeds. For instance, the seed-related parameters of the real seeds may be inferred to be the same as the seed-related parameters of the artificial seeds. Accordingly, the seed-related parameters of the real seeds may be more easily and reliably monitored by monitoring the seed-related parameters of the artificial seeds.

Referring now to drawings, FIG. 1 illustrates a perspective view of one embodiment of a planting implement (e.g., a planter 10) in accordance with aspects of the present subject matter. As shown in FIG. 1, the planter 10 may include a laterally extending toolbar or frame assembly 12 connected at its middle to a forwardly extending tow bar 14 to allow the planter 10 to be towed by a work vehicle (not shown), such as an agricultural tractor, in a direction of travel (e.g., as indicated by arrow 16). The frame assembly 12 may generally be configured to support a plurality of seed planting units (or row units) 18. As is generally understood, each row unit 18 may be configured to deposit seeds at a desired depth beneath the soil surface and at a desired seed spacing as the planter 10 is being towed by the work vehicle, thereby establishing rows of planted seeds. In some embodiments, the bulk of the seeds to be planted may be stored in one or more hoppers or seed tanks 20. Thus, as seeds are planted by the row units 18, a pneumatic distribution system may distribute additional seeds from the seed tanks 20 to the individual row units 18 via one or more delivery lines. Additionally, one or more fluid tanks 22 may store agricultural fluids, such as insecticides, herbicides, fungicides, fertilizers, and/or the like.

It should be appreciated that, for purposes of illustration, only a portion of the row units 18 of the planter 10 have been shown in FIG. 1. In general, the planter 10 may include any number of row units 18, such as 6, 8, 12, 16, 24, 32, or 36 row units. In addition, it should be appreciated that the lateral spacing between row units 18 may be selected based on the type of crop being planted. For example, the row units 18 may be spaced approximately 30 inches from one another for planting corn, and approximately 15 inches from one another for planting soybeans.

It should also be appreciated that the configuration of the planter 10 described above and shown in FIG. 1 is provided only to place the present subject matter in an exemplary field of use. Thus, it should be appreciated that the present subject matter may be readily adaptable to any manner of planter configuration or any other planting implement configuration, including seeders.

Figure 2:
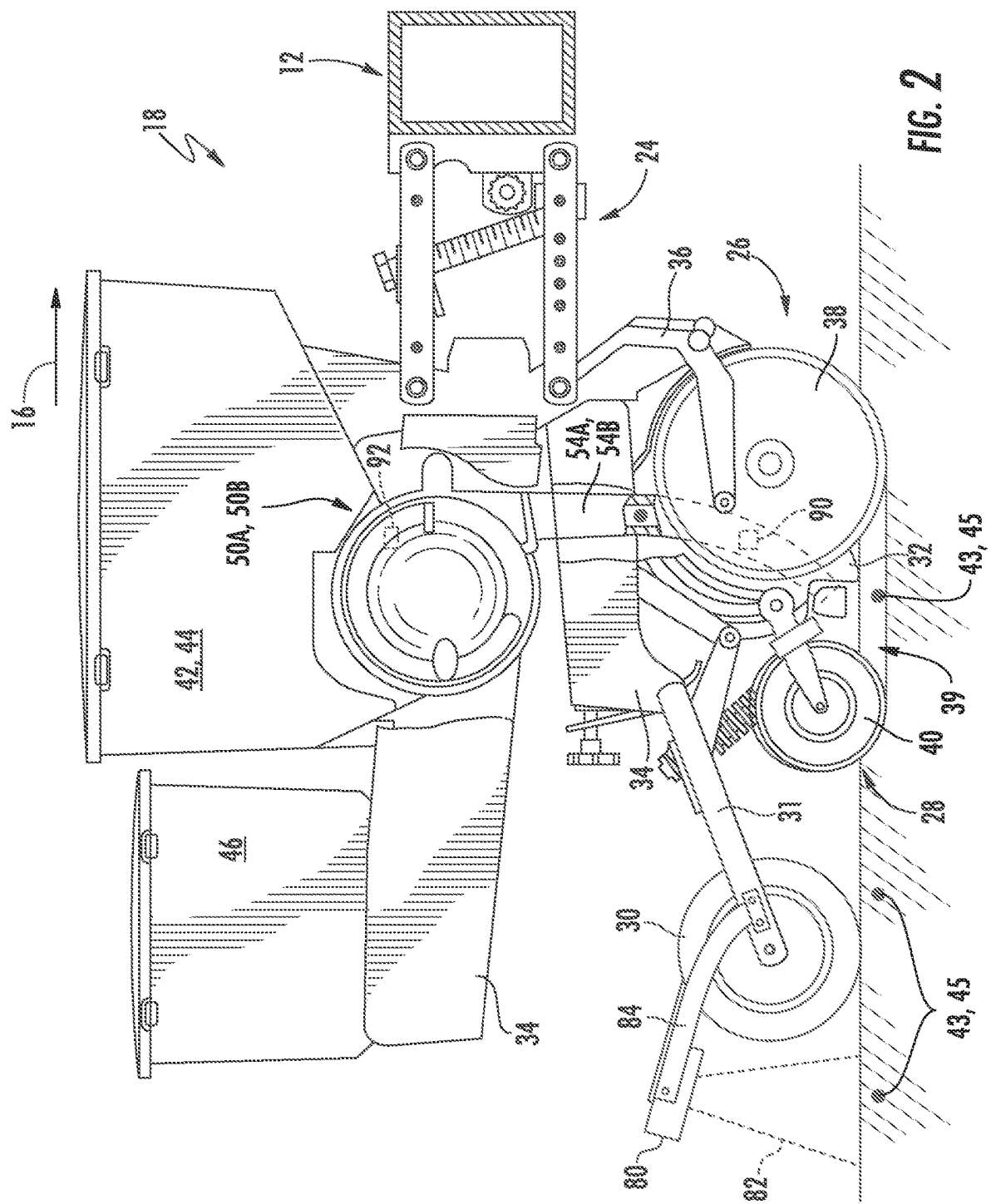
FIG. 2 illustrates a side view of one embodiment of a row unit suitable for use with a planting implement in accordance with aspects of the present subject matter.

Referring now to FIG. 2, a side view of one embodiment of a row unit 18 is illustrated in accordance with aspects of the present subject matter. As shown, the row unit 18 includes a linkage assembly 24 configured to mount the row unit 18 to the toolbar or frame assembly 12 of the planter 10. As shown in FIG. 2, the row unit 18 also includes a furrow opening assembly 26, a furrow closing assembly 28, and a press wheel 30. In general, the furrow opening assembly 26 may include a gauge wheel (not shown) operatively connected to a frame 34 of the row unit 18 via a support arm 36. Additionally, the opening assembly 26 may also include one or more opening disks 38 configured to excavate a trench or furrow 39 in the soil, and a firming point 32. The gauge wheel is not shown to better illustrate the opening disk 38. As is generally understood, the gauge wheel may be configured to engage the surface of the field, with the height of the opening disk(s) 38 being adjusted with respect to the position of the gauge wheel to set the desired depth of the furrow 39 being excavated. Moreover, as shown, the furrow closing assembly 28 may include a closing disk(s) 40 configured to close the furrow 39 after seeds 43, 45 have been deposited therein. The press wheel 30 may then be configured to roll over the closed furrow 39 to firm the soil over the seed 43, 45 and promote favorable seed-to-soil contact.

Figure 3:
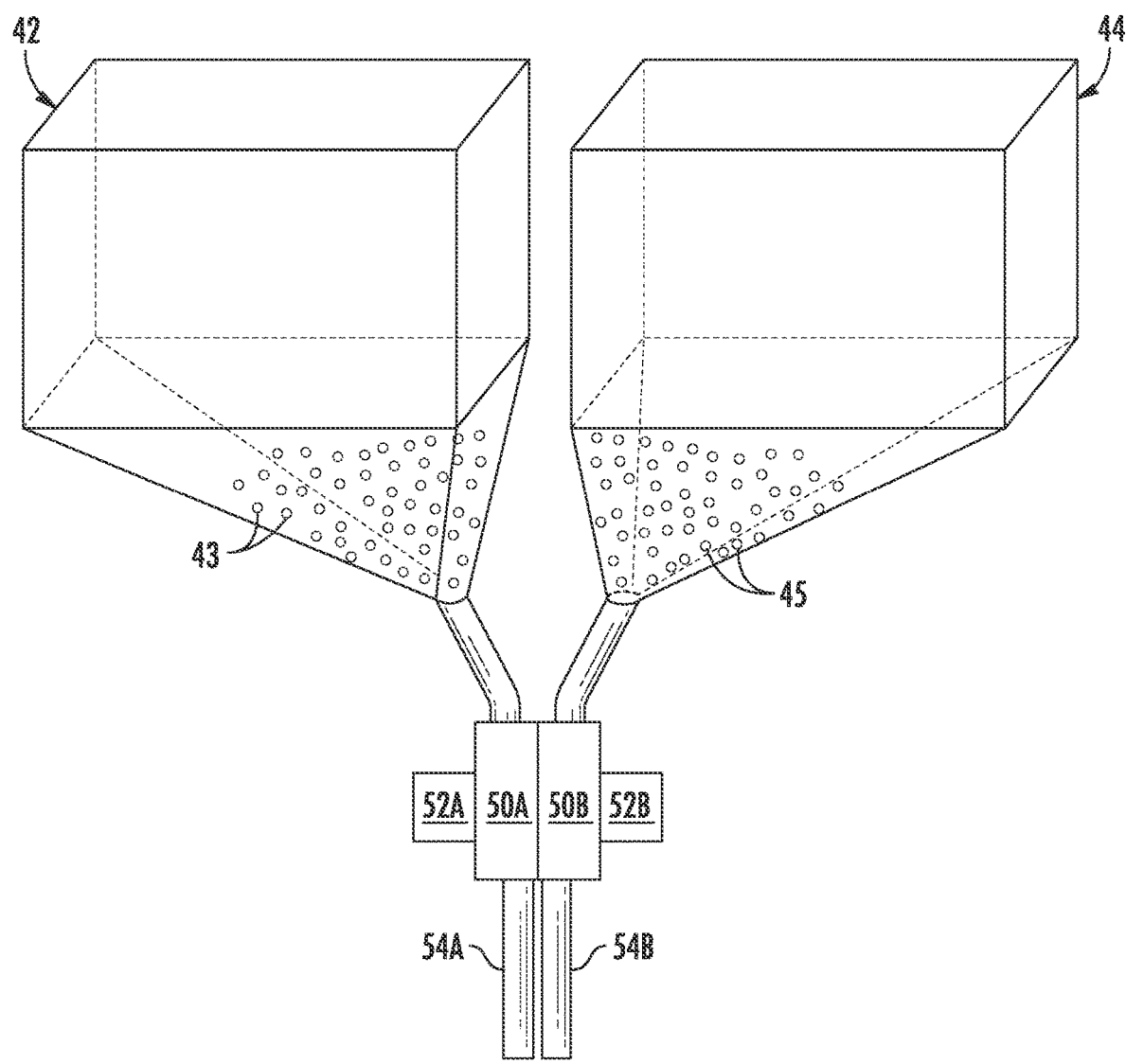
FIG. 3 illustrates a seed supply arrangement of a row unit for supplying seeds of differing types to be planted in accordance with aspects of the present subject matter.

Additionally, as shown in FIGS. 2 and 3, the row unit 18 may include one or more seed hoppers 42, 44 and, optionally, a fluid tank 46 supported on the frame 34. In general, the seed hopper(s) 42, 44 may be configured to store seeds received from the seed tanks 20, which are to be deposited within the furrow 39 as the row unit 18 moves over and across the field. For instance, in several embodiments, the row unit 18 may include a first seed hopper 42 configured to store seeds 43 (FIG. 3) of a first seed type and a second hopper 44 configured to store seeds 45 (FIG. 3) of a second seed type. In another embodiment, the row unit 18 may include more than two seed hoppers, with each seed hopper storing a different seed type. Alternatively, a single seed hopper may be used to store more than one type of seed. For example, a single seed hopper may be internally divided (e.g., via a divider wall(s)) so as to define separate seed chambers or compartments for storing differing seed types. Furthermore, the fluid tank 46 may be configured to store fluid received from the fluid tank 22 (FIG. 1), which is to be sprayed onto the seeds dispensed from the seed hoppers 42, 44 or while the seeds 43, 45 are held within the seed hoppers 42, 44.

Moreover, in one embodiment, the row unit 18 may include two seed meters 50A, 50B provided in operative association with the seed hopper(s) 42, 44. In general, the first seed meter 50A may be configured to release seeds 43 (FIG. 3) received from the first seed hopper 42 for deposit within the furrow 39, while the second seed meter 50B may be configured to release seeds 45 (FIG. 3) received from the second seed hopper 44 for deposit within the furrow 39. For instance, the seed meters 50A, 50B may each be coupled to a respective, suitable vacuum source 52A, 52B (e.g., a blower powered by a motor and associated tubing or hoses) configured to generate a vacuum or negative pressure that attaches the seeds to a respective rotating seed disk (not shown) of the respective seed meter 50A, 50B, which controls the rate at which the seeds are output from the respective seed meter 50A, 50B to a respective seed tube 54A, 54B. The seed tubes 54A, 54B may extend vertically between the seed meter 50A, 50B and the ground to facilitate delivery of the seeds output from the seed meter 50A, 50B to the furrow 39. As will be described below in greater detail, the seed meter 50A and the vacuum source 52A may be operated separately of the seed meter 50B and vacuum source 52B such that the seeds 43 stored in the first seed hopper 42 may be dispensed into the furrow 39 with or separately from the seeds 45 stored in the second seed hopper 44. For instance, the seed meter 50A and the vacuum source 52A may be configured to consistently meter out the seeds 43 (e.g., according to a desired population density) during a planting operation, whereas the seed meter 50B and the vacuum source 52B may be configured to meter out the seeds 45 selectively during the planting operation. For example, the seed meter 50B may be controlled to only rotate when a given seed 45 is to be dropped.

Referring still to FIG. 2, one or more seed sensors 80 may also be supported relative to each row unit 18. In general, the seed sensor(s) 80 may be configured to generate data indicative of the placement of the deposited seeds 43, 45 within the soil, thereby allowing one or more seed-related parameters to be determined for the associated planting operation (e.g., individual seed depth/position, relative seed spacing, seed population, missing seeds, etc.). In several embodiments, the seed sensor(s) 80 may be configured to detect seeds 43, 45 located underneath the soil surface (e.g., post-closing of the furrow 39). In such embodiments, the seed sensor(s) 80 may generally be configured to be installed on or otherwise positioned relative to the row unit 18 such that the sensor(s) 80 has a field of view or detection zone 82 directed towards the soil surface at a location aft of the furrow closing assembly 28 (e.g., relative to the direction of travel 16 of the planter 10). For instance, as shown in FIG. 2, the seed sensor(s) 80 is supported relative to the row unit 18 (e.g., via a support arm 84 coupled to an associated support arm 31 of the press wheel 30) such that the sensor(s) 80 is configured to generate data associated with a portion of the field located immediately behind the aft-most ground-engaging tool of the row unit 18 (e.g., the press wheel 30). However, in other embodiments, the detection zone 82 of the sensor(s) 80 may be directed at any other suitable location that allows the sensor(s) 80 to detect seeds 43, 45 positioned underneath the soil surface, such as at a location between the furrow closing assembly 28 and the press wheel 30.

In several embodiments, the seed sensor(s) 80 may correspond to a non-contact sensor configured to detect seeds 43, 45 located underneath the soil surface. For instance, in one embodiment, the seed sensor(s) 80 may be a ground-penetrating radar (GPR) configured to detect seeds deposited underneath the soil surface. In such an embodiment, the seed sensor(s) 80 may, for example, include one or more pairs of transmitters and receivers, with the transmitter(s) being configured to transmit electromagnetic waves towards and through the soil and the receiver(s) being configured to detect the waves as reflected off sub-surface features (e.g., seeds). In some embodiments, the seed sensor(s) 80 may additionally, or alternatively, include one or more electromagnetic induction (EMI) sensor(s). In such an embodiment, the seed sensor(s) 80 may, for example, include one or more transmitter coils configured to create a fluctuating electromagnetic field in the soil that induces a current in the conductive target object and one or more receivers configured to analyze a secondary electromagnetic field generated by the induced current. However, it should be appreciated that the seed sensor(s) 80 may correspond to any other suitable non-contact sensor capable of detecting seeds deposited underneath the soil surface.

When GPR is used, the waves generated by the GPR(s) 80 are reflected off the seeds due to the contrast between a dielectric property (e.g., the permittivity and/or conductivity) of the ground and a dielectric property of the seeds. Ground that is moist and/or has a high clay content generally has a higher permittivity and a higher conductivity than ground that is dry and/or sandy, and generally has a higher permittivity and a higher conductivity than seeds. While increased dielectric contrast between the ground and the seeds should show improved detectability of the seeds in moist and/or clay ground over drier and/or sandy ground, it is generally more difficult to identify where the seeds are located in moist and/or clay ground as the higher permittivity and the higher conductivity of the ground cause more attenuation of the waves generated by the GPR(s) 80. Higher attenuation means that the waves cannot penetrate as deeply for detecting the seeds. Similarly, when EMI sensors are used, the strength of the secondary electromagnetic field generated by the induced current is dependent on the electrical conductivity of the target object. For instance, more conductive materials (e.g., metals) typically generate stronger, and thus more detectable, secondary fields than less conductive materials. Seeds typically have a very low conductivity, which means that the secondary field generated by the induced current through the seeds is weak and is thus, hard to accurately detect.

Thus, in accordance with aspects of the present subject matter, the row unit 18 may be configured to deposit an artificial seed with or in place of a real seed where the artificial seeds are more detectable by the seed sensor(s) 80 than the real seeds. For instance, the seeds 43 received by the first seed hopper 42 may be real seeds (e.g., plant-based seeds that can mature into a plant, such as crop seeds), while the seeds 45 received by the second seed hopper 44 may be artificial seeds (e.g., manufactured seeds that will not mature into a plant, such as non-plant-based seeds). The artificial seeds 45 may have a similar size and/or shape to the real seeds 43 such that the artificial seeds 45 will have a similar placement in the furrow 39 as the real seeds 43. The artificial seeds 45 have a dielectric property (e.g., the permittivity and/or conductivity) that is different than the real seeds 43, such that there is a different interaction between the electromagnetic energy generated by the seed sensor(s) 80 and the artificial seeds 45 than an interaction between the electromagnetic energy generated by the seed sensor(s) 80 and the real seeds 43 in a way that allows the artificial seeds 45 to be more visible to the seed sensor(s) 80 than the real seeds 43. As such, one or more seed-related parameter(s) of the real seeds 43 may be inferred based on the seed-related parameter(s) of the artificial seeds 45.

For instance, in several embodiments, the artificial seeds 45 may have a conductivity that is greater than a conductivity of the real seeds 43. More particularly, real seeds have a conductivity that is very low or essentially zero when able to be germinated, whereas artificial seeds 45 may be made of materials having a very high electrical conductivity (e.g., metals) such that the artificial seeds 45 are essentially "perfect electric conductors." For example, the artificial seeds 45 may be made of metals, including but not limited to, stainless steel having an electrical conductivity of approximately 11,000 Siemens/centimeter [S/cm], lead having an electrical conductivity of approximately 45,600, solder having an electrical conductivity of approximately 70,000 S/cm, iron having an electrical conductivity of approximately 103,000, nickel having an electrical conductivity of approximately 144,900 S/cm, aluminum having an electrical conductivity of 381,600 S/cm, and/or any other suitable materials having a higher electrical conductivity, such as, but not limited to, graphite having an electrical conductivity of approximately 10000 S/cm, magnetite having an electrical conductivity of approximately 100 S/cm, and/or the like. Artificial seeds 45 having a higher electrical conductivity may be more visible to both GPR and EMI sensors.

In some embodiments, the artificial seeds 45 have a permittivity that is different than a permittivity of the real seeds 43. For example, the permittivity of real seeds (e.g., corn) may have a dielectric permittivity between 3-5 whereas the artificial seeds 45 may be made of a metal having a dielectric permittivity of approximately 1, graphite having a dielectric permittivity of approximately 18, magnetite having a dielectric permittivity between 33-81, and/or any other suitable material. The different permittivity of the artificial seeds 45 may generally improve visibility to GPR.

It should be appreciated that by providing separate seed meters 50A, 50B for dropping the real seeds 43 and the artificial seeds 45, the artificial seeds 45 may be deposited with the real seeds 43 such that the potential yield for the field remains the same. Similarly, the artificial seeds 45 may be selectively deposited instead of the real seeds 43, such as when an error condition is suspected or confirmed, to prevent real seeds 43 from being potentially improperly planted and wasted. It should further be appreciated that, in some embodiments, the artificial seeds 45 may be mixed in with the real seeds 43 in one or more of the seed hoppers 20, 42, 44, such that the row unit 18 only includes one seed meter and one vacuum source, and the artificial seeds 45 are randomly deposited into the furrow 39 in place of real seeds 43, which provides cost savings and reduces the weight of the row unit 18.

Additionally, in several embodiments, the row unit 18 may also include one or more sensors 90, 92 for generating data indicative of the timing and/or frequency of seeds being deposited into the furrow 39 between the opening and closing assemblies 26, 28. For instance, as shown in the illustrated embodiment, the row unit 18 may include one or more seed tube sensors 90 configured to detect seeds as they fall or otherwise travel through the seed tube(s) 54A, 54B. In such an embodiment, the seed tube sensor(s) 90 may generally correspond to any suitable sensor or sensing device configured to detect seeds passing through the seed tube(s) 54A, 54B (e.g., whether falling through the tube(s) 54A, 54B via gravity or by being conveyed through the seed tube(s) 54A, 54B via a driven belt or other seed-transport means extending within the seed tube(s) 54A, 54B). For example, the seed tube sensor(s) 90 may correspond to an optical sensor (e.g., a break-beam sensor or a reflectance sensor), a microwave sensor, a Hall-effect sensor, and/or the like.

In addition to the seed tube sensor(s) 90 (or as an alternative thereto), the row unit 18 may include other sensors for generating data indicative of the timing and frequency of seeds being deposited into the furrow 39. For instance, as shown in the illustrated embodiment, the row unit 18 may include one or more seed meter sensors 92 configured to detect seeds that are being or will be discharged from the seed meter(s) 50A, 50B. Specifically, in one embodiment, the seed meter sensor(s) 92 may correspond to a post-singulation sensor positioned within the seed meter(s) 50A, 50B such that the sensor's detection zone is aligned with a location within a post-singulation region of the seed meter(s) 50A, 50B: (1) across which the seed disc or other seed transport member is rotated following the singulator (not shown) of the seed meter(s) 50A, 50B; and/or (2) through which each seed to be discharged from seed meter(s) 50A, 50B passes following release of the seed from the seed disc. In such an embodiment, the seed meter sensor(s) 92 may generally correspond to any suitable sensor or sensing device configured to detect seeds that are being or will be discharged from the seed meter(s) 50A, 50B. For example, the seed meter sensor(s) 92 may correspond to an optical sensor (e.g., a break-beam sensor or a reflectance sensor), a microwave sensor, a Hall-effect sensor, and/or the like.

It should be appreciated that the configuration of the row unit 18 described above and shown in FIGS. 2 and 3 is provided only to place the present subject matter in an exemplary field of use. Thus, it should be appreciated that the present subject matter may be readily adaptable to any manner of row unit configuration.

Figure 4:
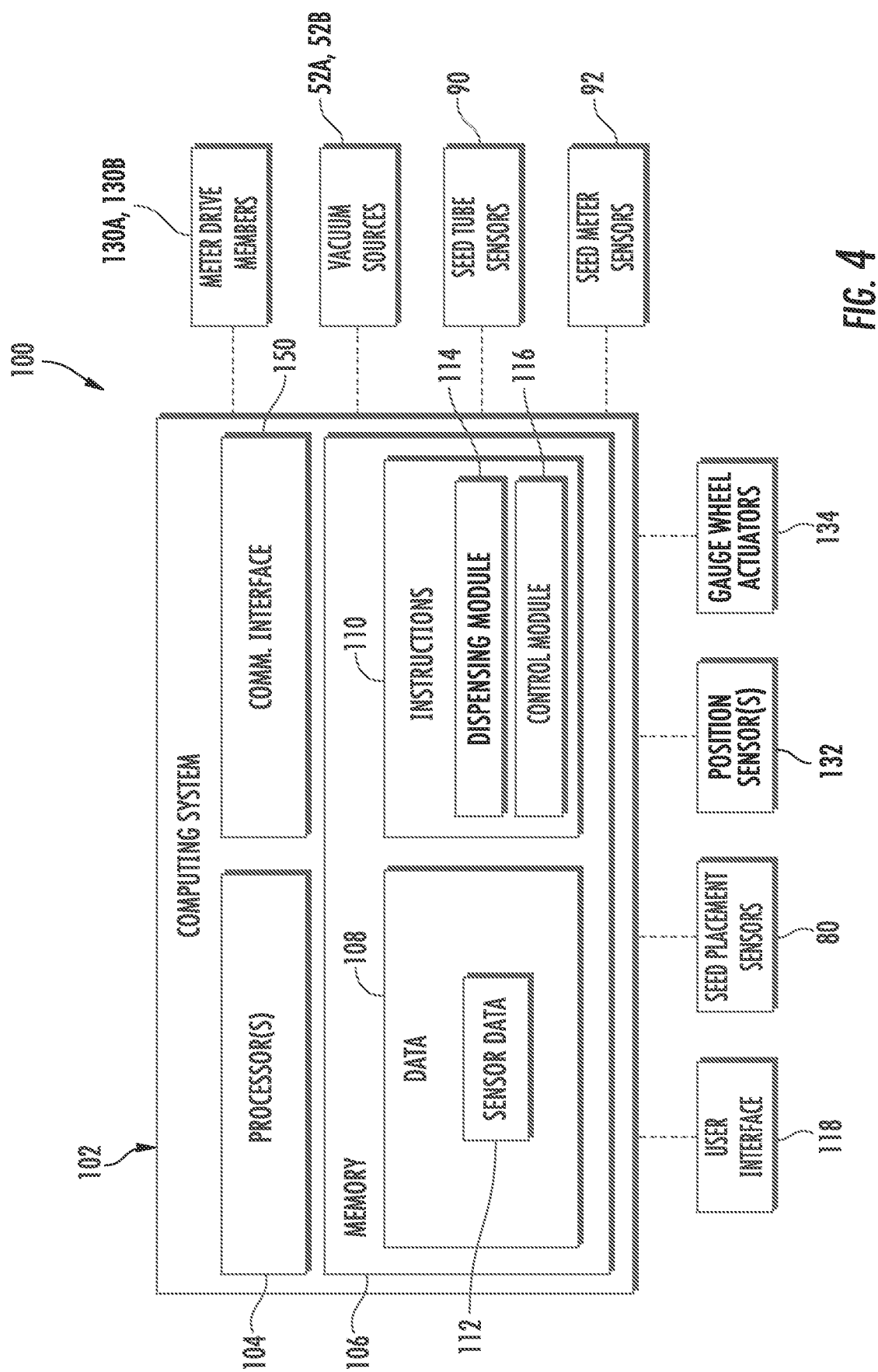
FIG. 4 illustrates a schematic view of a system for monitoring seed placement within the ground during the performance of a planting operation in accordance with aspects of the present subject matter.

Referring now to FIG. 4, a schematic view of one embodiment of a system 100 for monitoring seed placement within the ground during the performance of a planting operation is illustrated in accordance with aspects of the present subject matter. In general, the system 100 will be described herein with reference to the planting implement 10, the row unit 18, and related components described above with reference to FIGS. 1-3. However, it should be appreciated that the disclosed system 100 may generally be utilized with any planter or seeder having any suitable implement configuration and/or with row units having any suitable row unit configuration.

In several embodiments, the system 100 may include a computing system 102 and various other components configured to be communicatively coupled to and/or controlled by the computing system 102, such as meter drive members 130A, 130B configured to rotationally drive the seed meters 50A, 50B, respectively, the vacuum sources 52A, 52B, a gauge wheel actuator 134 configured to actuate gauge wheel of the row unit 18 to adjust the current planting depth, and/or various sensors configured to monitor one or more operating parameters associated with each row unit 18. For example, the computing system 102 may be communicatively coupled to the seed sensor(s) 80 (e.g., at least one sensor 80 per row unit) configured to generate data indicative of the placement of the deposited seeds within the soil, such as ground-penetrating radars configured to detect seeds located underneath the soil surface. Further, the computing system 102 may be communicatively coupled to one or more additional sensors configured to generate data indicative of the frequency of the seeds being deposited within the furrow by each row unit, such as the seed tube sensor(s) 90 and/or the seed meter sensor(s) 92 provided in association with each row unit 18. Additionally, the computing system 102 may be communicatively coupled to one or more position sensor(s) 132 to determine the location of the planting implement 10, such as a satellite navigation positioning device (e.g. a GPS system, a Galileo positioning system, a Global Navigation satellite system (GLONASS), a BeiDou Satellite Navigation and Positioning system, a dead reckoning device, and/or the like).

It should be appreciated that the computing system 102 may correspond to any suitable processor-based device(s), such as a computing device or any combination of computing devices. Thus, as shown in FIG. 4, the computing system 102 may generally include one or more processor(s) 104 and associated memory devices 106 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 106 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 106 may generally be configured to store information accessible to the processor(s) 104, including data 108 that can be retrieved, manipulated, created and/or stored by the processor(s) 104 and instructions 110 that can be executed by the processor(s) 104.

In several embodiments, the data 108 may be stored in one or more databases. For example, the memory 106 may include a sensor database 112 for storing sensor data and/or other relevant data that may be used by the computing system 102 in accordance with aspects of the present subject matter. For instance, during operation of the planting implement, data from all or a portion of the sensors 80, 90, 92, 132 communicatively coupled to the computing system 102 may be stored (e.g., temporarily) within the sensor database 112 and subsequently used to determine one or more parameter values associated with the operation of the planting implement.

Moreover, in several embodiments, the instructions 110 stored within the memory 106 of the computing system 102 may be executed by the processor(s) 104 to implement a dispensing module 114. In general, the dispensing module 114 may be configured to control the operation of the meter drive members 130A, 130B and the vacuum sources 52A, 52B to control the dispensing of the seeds 43, 45 into the furrow 39. For instance, the computing system 102 may control the operation of the seed meter(s) 50A and the vacuum source(s) 52A to drop real seeds 43 within a furrow 39 according to a desired population density, seed spacing, distance interval and/or the like, such as according to a prescription map associated with the field. In some embodiments, the computing system 102 may additionally control the operation of the seed meter(s) 50B and vacuum source(s) 52B to drop an artificial seed 45 with each real seed 43 such that an artificial seed 45 is deposited next to each real seed 43 in the furrow 39 (e.g., along the direction of travel 16). However, in some embodiments, the computing system 102 may control the operation of the seed meter(s) 50B and vacuum source(s) 52B to deposit artificial seeds 45 according to another desired population density, seed spacing, distance interval, etc., prescription map, and/or to selectively or "on-demand" drop an artificial seed 45.

For instance, in some embodiments, the computing system 102 may control the operation of the seed meter(s) 50B and vacuum source(s) 52B to deposit an artificial seed 45 intermittently with, or instead of, a real seed 43 at predetermined distance intervals along a given pass across the field of the path (e.g., every 50 ft, 100 ft, 200 ft, 1000 ft, and/or the like), predetermined time intervals (e.g., every 5 minutes, 10 minutes, etc.), after a predetermined number of real seeds 43 have been deposited (e.g., after every 100 real seeds, 200 real seeds, 500 real seeds, 1000 real seeds, etc. have been planted), and/or the like. It should be appreciated that any suitable number of artificial seeds 45 may be deposited in the furrow 39 at each interval. For instance, only one artificial seed 45 may be deposited at each interval or a series of artificial seeds 45 (e.g., two, three, or more artificial seeds 45) may be sequentially planted at each interval.

In some embodiments, for instance, the computing system 102 may be configured to monitor the position of the planter 10 relative to an associated planting prescription map to determine whether the row unit(s) 18 will encounter a confirmation boundary (i.e., a boundary at which it is prescribed to deposit artificial seeds 45 in place of or with real seeds 43) along a given path across the field. For example, in some embodiments, a confirmation boundary may be associated with a headland or end-of-row turn. For example, in the event that it is determined that a row unit(s) 18 will encounter a headlands-related confirmation boundary, such as when the row unit(s) 18 is within a threshold distance of the headland turn, the computing system 102 may control the operation of the seed meter(s) 50B and vacuum source(s) 52B to drop an artificial seed 45 with, or instead of a real seed 43 on a given row of a pass across the field, before beginning the headland turn. In some embodiments, the computing system 102 may further control the operation of the seed meter(s) 50B and vacuum source(s) 52B to drop an artificial seed 45 with, or instead of a real seed 43 at the beginning of another row of a next given pass across the field after performing the headland turn.

As indicated above, in some embodiments, the computing system 102 may control the operation of the seed meter(s) 50B and vacuum source(s) 52B to drop an artificial seed 45 with, or instead, of a real seed 43 on-demand, based at least in part on an input by an operator received via a user interface (e.g., user interface 118 associated with the planter 10).

It should be appreciated that, in some embodiments, when an artificial seed 45 is to be deposited instead of a real seed 43, the computing system 102 may further control the operation of the seed meter(s) 50A and the vacuum source(s) 52A to not drop a real seed 43 while the seed meter(s) 50B drops artificial seed(s) 45, and to resume dropping real seeds 43 after the seed meter(s) 50B drop artificial seed(s) 45.

Referring still to FIG. 4, in several embodiments the instructions 110 stored within the memory 106 of the computing system 102 may also be executed by the processor(s) 104 to implement a control module 116. In general, the control module 116 may be configured to initiate a control action based on the seed-related parameter(s) determined using the data generated by the seed sensor(s) 80. For instance, the control module 116 may determine seed-related parameter(s), such as the seed depth, seed position within a trench, relative seed spacing, seed population, row overlap, and/or the like, for the artificial seeds 45 based at least in part on the data generated by the seed sensor(s) 80 indicative of at least the artificial seeds 45 as deposited and planted beneath the surface of the field. Thereafter, the control module 116 may determine one or more of the seed-related parameter(s) for the real seeds 43 based at least in part on the seed-related parameter(s) of the artificial seeds 45. For instance, in one embodiment, the control module 116 may infer that the seed-related parameter(s) of the real seeds 43 are the same as the seed-related parameter(s) of the artificial seeds 45. However, it should be appreciated that any other suitable relationship between the seed-related parameter(s) of the real seeds 43 and the artificial seeds 45 may instead be used.

Thereafter, in one embodiment, the control module 116 may be configured to provide a notification to the operator indicating the determined seed-related parameter(s) of the seeds 43, 45. For instance, in one embodiment, the control module 116 may cause a visual or audible notification or indicator to be presented to the operator via an associated user interface 118 provided within the cab of the vehicle used to tow the planting implement 10. For example, the control module 116 may cause a visual or audible notification or indicator to be presented to the operator via the associated user interface 118 indicative of when the current seed depth is outside of a predetermined seed depth range, the seed position is not within a certain portion of the trench, the current seed spacing is outside of a predetermined seed spacing range, the seed population is outside of a predetermined seed population range, rows are overlapping after a headland turn, and/or the like.

Alternatively, or additionally, the control module 116 may be configured to execute an automated control action designed to adjust the operation of the row unit 18 or the planting implement 10 based at least in part on the determined seed-related parameter(s) of the seeds 43, 45. For instance, in one embodiment, the computing system 102 may be configured to automatically adjust the depth of the furrow being cut into the soil (e.g., by adjusting the relative position of the gauge wheel and opening assembly 26 via control of the gauge wheel actuator 134) based on placement data associated with the current depth at which the seeds are being planted. Similarly, in one embodiment, the computing system 102 may be configured to automatically adjust the operation of the seed meter 50 to vary the rate at which seeds are being deposited within the soil based on placement data associated with the current seed spacing and/or seed population. For instance, the computing system 102 may be configured to increase or decrease the speed at which the seed disc of the seed meter 50 is being rotated (e.g., via control of the meter drive member(s) 130A) if it is determined that the seed spacing needs to be adjusted relative to a target seed spacing range. Similarly, the computing system 102 may be configured to increase or decrease the vacuum pressure applied to the seed meter(s) 50A (e.g., via control of the vacuum source(s) 52A) if it is determined that the current seed population is too low or too high relative to a target seed population range. Additionally, or alternatively, the computing system 102 may be configured to steer the planter 10 if it is determined that there is row overlap.

Moreover, as shown in FIG. 4, the computing system 102 may also include a communications interface 150 to provide a means for the computing system 102 to communicate with any of the various other system components described herein. For instance, one or more communicative links or interfaces (e.g., one or more data buses) may be provided between the communications interface 150 and the meter drive members 130A, 130B, the vacuum sources 52A, 52B, and the gauge wheel actuators 134 to allow the computing system 102 to transmit control signals for controlling the operation of such components. Similarly, one or more communicative links or interfaces (e.g., one or more data buses) may be provided between the communications interface 150 and the various sensors 80, 90, 92, 132 to allow the associated sensor data to be transmitted to the computing system 102.

It should be appreciated that, in general, the computing system 102 may include suitable computing device(s) that is configured to function as described herein. In several embodiments, the computing system 102 may form part of an active planting system configured to perform a planting operation, such as by including a vehicle controller of a work vehicle configured to tow an associated planting implement 10 and/or an associated implement controller of the planting implement 10.

Figure 5:
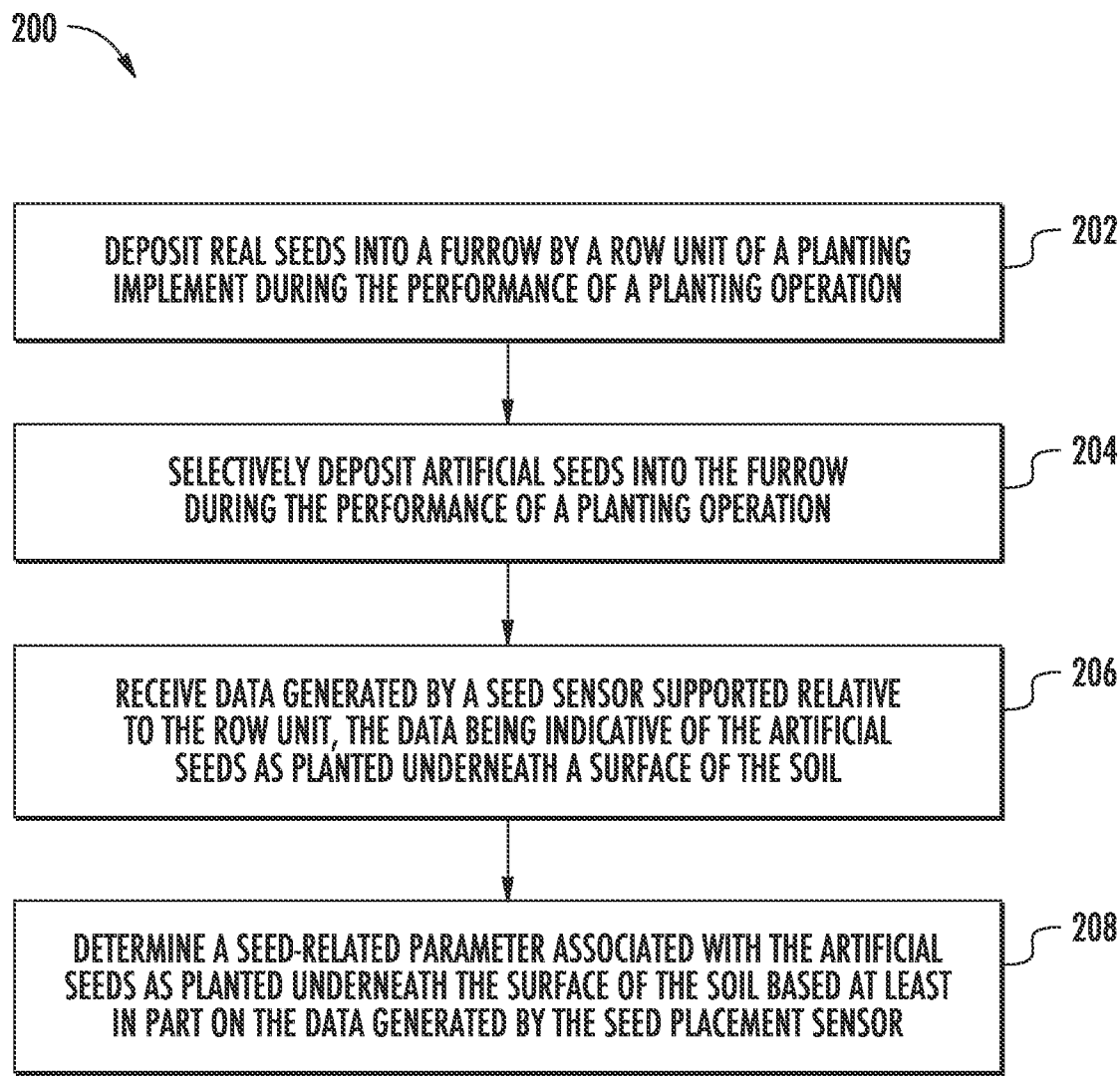
FIG. 5 illustrates a flow diagram of one embodiment of a method for monitoring seed placement within the ground during the performance of a planting operation in accordance with aspects of the present subject matter.

Referring now to FIG. 5, a flow diagram of one embodiment of a method 200 for monitoring seed placement within the ground during the performance of a planting operation is illustrated in accordance with aspects of the present subject matter. In general, the method 200 will be described herein with reference to the planting implement 10, row unit 18, and system 100 described above with reference to FIGS. 1-4. However, it should be appreciated by those of ordinary skill in the art that the disclosed method 200 may generally be utilized to monitor seed placement in associated with any planting implement having any suitable implement configuration, any row unit having any suitable row unit configuration, and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include depositing real seeds into a furrow by a row unit of a planting implement during the performance of a planting operation. For instance, as indicated above, the row unit(s) 18 of the planting implement 10 may be configured to deposit the real seeds 43 into the furrow 39 during a planting operation.

Further, at (204), the method 200 may include selectively depositing artificial seeds into the furrow during the performance of the planting operation. For example, as discussed above, the row unit(s) 18 of the planting implement 10 may also be configured to selectively deposit the artificial seeds 45 into the furrow 39 during the planting operation. As described above, the artificial seeds 45 may be configured to be more detectable to GPR and/or EMI sensors than the real seeds 43. For instance, the artificial seeds 45 may be metal seeds.

Moreover, at (206), the method 200 may include receiving data generated by a seed sensor supported relative to the row unit, the data being indicative of the artificial seeds as planted underneath a surface of the soil. For instance, as indicated above, the seed sensor 80 may generate data indicative of the artificial seeds 45 as planted underneath a surface of the soil, where the data clearly indicates the artificial seeds 45 underneath the surface of the soil compared to the surrounding soil.

Additionally, at (208), the method 200 may include determining a seed-related parameter associated with the artificial seeds as planted underneath the surface of the soil based at least in part on the data generated by the seed sensor. For example, as discussed above, the computing system 102 may determine the seed-related parameter (e.g., individual seed depth/position, relative seed spacing, seed population, etc.) associated with the artificial seeds 43 as planted underneath the surface of the soil based at least in part on the data 112 generated by the seed sensor 80.

It is to be understood that the steps of the method 200 are performed by the computing system 100 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the computing system 100 described herein, such as the method 200, is implemented in software code or instructions which are tangibly stored on a tangible computer readable medium. The computing system 100 loads the software code or instructions via a direct interface with the computer readable medium or via a wired and/or wireless network. Upon loading and executing such software code or instructions by the computing system 100, the computing system 100 may perform any of the functionality of the computing system 100 described herein, including any steps of the method 200 described herein.

The term "software code" or "code" used herein refers to any instructions or set of instructions that influence the operation of a computer or computing system. They may exist in a computer-executable form, such as machine code, which is the set of instructions and data directly executed by a computer's central processing unit or by a computing system, a human-understandable form, such as source code, which may be compiled in order to be executed by a computer's central processing unit or by a computing system, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a computing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring seed placement within the ground during the performance of a planting operation, the system comprising:
    a row unit configured to deposit seeds within soil, the row unit including a furrow opening assembly configured to create a furrow in the soil for depositing seeds and a furrow closing assembly configured to close the furrow after the seeds have been deposited therein, the seeds deposited within the soil including both real seeds and artificial seeds;
    a seed sensor supported relative to the row unit and being configured to generate data indicative of the artificial seeds as planted underneath a surface of the soil according to a dielectric property of the artificial seeds; and
    a computing system communicatively coupled to the seed sensor, the computing system being configured to:
        receive the data generated by the seed sensor; and
        determine a seed-related parameter associated with the artificial seeds as planted underneath the surface of the soil based at least in part on the data generated by the seed sensor.

2. The system of claim 1, wherein the seed sensor comprises at least one of a ground-penetrating radar or an electromagnetic induction sensor.

3. The system of claim 1, wherein the computing system is further configured to determine a seed-related parameter associated with the real seeds based at least in part on the seed-related parameter associated with the artificial seeds.

4. The system of claim 1, wherein the seed-related parameter comprises at least one of a seed depth of each of the seeds, a spacing between the seeds, or a population density of the seeds.

5. The system of claim 1, wherein the computing system is further configured to:
    control the row unit to deposit the real seeds; and
    control the row unit to deposit the artificial seeds.

6. The system of claim 5, wherein the artificial seeds are deposited when the row unit is within a threshold distance of at least one of an end of a row before beginning an end-of-row turn during the planting operation or a beginning of another row after the end-of-row turn.

7. The system of claim 5, wherein the artificial seeds are deposited according to a predetermined interval.

8. The system of claim 5, wherein one of the artificial seeds is deposited with each of the real seeds.

9. The system of claim 5, wherein the real seeds are not deposited while the artificial seeds are being deposited.

10. The system of claim 1, wherein the artificial seeds comprise metal.

11. The system of claim 1, wherein a conductivity of the artificial seeds is greater than a conductivity of the real seeds.

12. A method for monitoring seed placement within the ground during the performance of a planting operation by a row unit configured to deposit seeds within soil, the row unit including a furrow opening assembly configured to create a furrow in the soil for depositing seeds and a furrow closing assembly configured to close the furrow after the seeds have been deposited therein, the method comprising:
    depositing real seeds into the furrow during the performance of the planting operation;
    selectively depositing artificial seeds into the furrow during the performance of the planting operation;

receiving, with a computing device, data generated by a seed sensor supported relative to the row unit, the data being indicative of the artificial seeds as planted underneath a surface of the soil by the row unit during the planting operation; and determining, with the computing device, a seed-related parameter associated with the artificial seeds as planted underneath the surface of the soil.

13. The method of claim 12, wherein the seed-related parameter comprises at least one of a seed depth of each of the seeds, a spacing between the seeds, or a population density of the seeds.

14. The method of claim 12, further comprising determining, with the computing device, a seed-related parameter associated with the real seeds based at least in part on the seed-related parameter associated with the artificial seeds.

15. The method of claim 12, further comprising performing, with the computing device, a control action associated with the row unit based at least in part on the seed-related parameter.

16. The method of claim 12, wherein the seed sensor comprises at least one of a ground-penetrating radar or an electromagnetic induction sensor.

17. The method of claim 12, wherein the artificial seeds comprise metal.

18. The method of claim 12, wherein selectively depositing the artificial seeds into the furrow during the performance of the planting operation comprises controlling, with the computing device, an operation of the row unit to deposit the artificial seeds into the furrow when the row unit is within a threshold distance of at least one of an end of a row before beginning an end-of-row turn during the planting operation or a beginning of another row after the end-of-row turn.

19. The method of claim 12, wherein selectively depositing the artificial seeds into the furrow during the performance of the planting operation comprises controlling, with the computing device, an operation of the row unit to deposit the artificial seeds intermittently according to a predetermined interval.

20. The method of claim 12, wherein selectively depositing the artificial seeds into the furrow during the performance of the planting operation comprises controlling, with the computing device, an operation of the row unit to deposit one of the artificial seeds into the furrow with the depositing of each of the real seeds.

* * * * *